United States Patent
Ogawa

(10) Patent No.: US 11,868,345 B2
(45) Date of Patent: Jan. 9, 2024

(54) INFORMATION PROCESSING SYSTEM, ELECTRONIC DEVICE, INFORMATION PROCESSING METHOD, AND RECORDING MEDIUM

(71) Applicant: CASIO COMPUTER CO., LTD., Tokyo (JP)

(72) Inventor: Kentaro Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 581 days.

(21) Appl. No.: 16/136,002

(22) Filed: Sep. 19, 2018

(65) Prior Publication Data
US 2019/0095484 A1 Mar. 28, 2019

(30) Foreign Application Priority Data
Sep. 26, 2017 (JP) .................................. 2017-185004

(51) Int. Cl.
G06F 16/2453 (2019.01)
G06F 16/248 (2019.01)
G06F 16/2457 (2019.01)

(52) U.S. Cl.
CPC ........ *G06F 16/2453* (2019.01); *G06F 16/248* (2019.01); *G06F 16/24575* (2019.01)

(58) Field of Classification Search
CPC ........... G06Q 10/063; G06Q 10/06315; G06Q 10/06; G06Q 10/06375; G06Q 10/0639; G06F 16/90335; G06F 16/904; G06F 30/20; G06F 16/958; G06F 16/22; G06F 16/2457; G06F 16/2462; G06F 16/25; G06N 5/02;
(Continued)

(56) References Cited

U.S. PATENT DOCUMENTS 5,918,222 A * 6/1999 Fukui ..................... G06Q 10/10
6,473,794 B1 * 10/2002 Guheen .................. H04L 41/22
709/223
(Continued)

FOREIGN PATENT DOCUMENTS

JP 2006285299 A 10/2006
JP 2007334919 A 12/2007
(Continued)

OTHER PUBLICATIONS

Instruction Manual for XD-G4800 and XD-G4900 of the EX-word DATAPLUS 10 series of electronic dictionaries (Casio Computer Co., Ltd.) published on the Internet (http://support.casio.jp/storage/pdf/003/XD-G4800_WA_JA.pdf).
(Continued)

*Primary Examiner* — Tony Mahmoudi
*Assistant Examiner* — Linh Black
(74) *Attorney, Agent, or Firm* — Holtz, Holtz & Volek PC

(57) ABSTRACT

A data processing method includes: selecting one or more contents from a plurality of contents each of which includes a first plurality of terms, based on a history of search terms and browsing states of the plurality of contents, the search terms having been searched for in a database storing a second plurality of terms and related information of each of the second plurality of terms; and outputting information representing the selected one or more contents.

10 Claims, 10 Drawing Sheets

(58) Field of Classification Search
CPC .............. H04L 43/50; G05B 23/0221; Y10S 707/99932; Y10S 707/99933
USPC ............. 707/600, 694, 720–721, 765–768, 707/E17.112, 784–785, 787, 804
See application file for complete search history.

(56) References Cited

U.S. PATENT DOCUMENTS

| | | | | |
|---|---|---|---|---|
| 6,651,097 B1* | 11/2003 | Maruyama | ............... | G09B 5/14 709/227 |
| 7,153,137 B2* | 12/2006 | Altenhofen | ............. | G09B 5/00 434/350 |
| 7,413,442 B2* | 8/2008 | Okunishi | ................. | G09B 7/02 434/350 |
| 7,433,646 B2* | 10/2008 | Fujino | ..................... | G09B 5/08 434/118 |
| 7,599,916 B2* | 10/2009 | Weare | ................. | G06F 16/9535 |
| 7,769,541 B2* | 8/2010 | Watanabe | ............. | G01C 21/32 701/453 |
| 7,840,175 B2* | 11/2010 | Hochwarth | ............. | G09B 7/02 434/350 |
| 7,865,516 B2* | 1/2011 | Becker | ................. | G06F 16/907 707/766 |
| 8,260,731 B2* | 9/2012 | Maruyama | ........... | G06F 16/353 706/46 |
| 8,331,655 B2* | 12/2012 | Sato | ..................... | G06K 9/4609 382/159 |
| 8,539,529 B2* | 9/2013 | Sloo | ..................... | H04N 5/4401 725/53 |
| 8,571,462 B2* | 10/2013 | Hochwarth | ............. | G09B 5/06 434/350 |
| 8,577,911 B1* | 11/2013 | Stepinski | ............ | G06F 16/3328 707/765 |
| 8,628,331 B1* | 1/2014 | Wright | ................... | G09B 19/00 434/236 |
| 8,631,009 B2* | 1/2014 | Lisa | ....................... | G06F 16/951 707/758 |
| 8,645,390 B1* | 2/2014 | Oztekin | .............. | G06F 16/9535 707/721 |
| 8,706,664 B2* | 4/2014 | Downs | ................... | G06F 16/355 706/20 |
| 8,984,048 B1* | 3/2015 | Maniscalco | ........... | G06F 16/951 709/201 |
| 9,002,895 B2* | 4/2015 | Doig | ................... | G06Q 30/0276 707/793 |
| 9,183,560 B2* | 11/2015 | Abelow | ................. | G06Q 10/10 |
| 9,274,251 B2* | 3/2016 | Pasken | .................... | G01W 1/10 |
| 10,078,672 B2* | 9/2018 | Nakano | ................. | G06F 16/248 |
| 10,482,149 B2* | 11/2019 | Gururaj | ................ | G06F 16/955 |
| 10,558,694 B2* | 2/2020 | Zou | ...................... | G06F 16/3349 |
| 10,691,698 B2* | 6/2020 | Chandrasekaran | .... | G06N 5/048 |
| 10,789,602 B2* | 9/2020 | Levy | ................... | G06Q 30/0201 |
| 10,825,348 B2* | 11/2020 | Angel | ....................... | G09B 7/06 |
| 11,080,336 B2* | 8/2021 | Van Dusen | ........... | G07C 13/00 |
| 2007/0202481 A1 | 8/2007 | Smith et al. | | |
| 2010/0070448 A1* | 3/2010 | Omoigui | ............ | H01L 27/1463 706/55 |
| 2012/0215626 A1* | 8/2012 | Ramer | ............... | G06Q 30/0269 705/14.55 |
| 2013/0151555 A1 | 6/2013 | Miyano | | |

FOREIGN PATENT DOCUMENTS

| | | |
|---|---|---|
| JP | 2011138347 A | 7/2011 |
| JP | 2011257932 A | 12/2011 |
| JP | 2012216089 A | 11/2012 |
| JP | 2017021637 A | 1/2017 |

OTHER PUBLICATIONS

Japanese Office Action dated Sep. 6, 2021 (and English translation thereof) issued in Japanese Application No. 2017-185004.

* cited by examiner

FIG. 6
| LEARNING PLAN | CONTENTS |
|---|---|
| PLAN A | CONTENT A + CONTENT B |
| PLAN B | CONTENT A + CONTENT B + CONTENT C |
| PLAN C | CONTENT C + CONTENT D |
| ⋮ | ⋮ |
FIG. 7
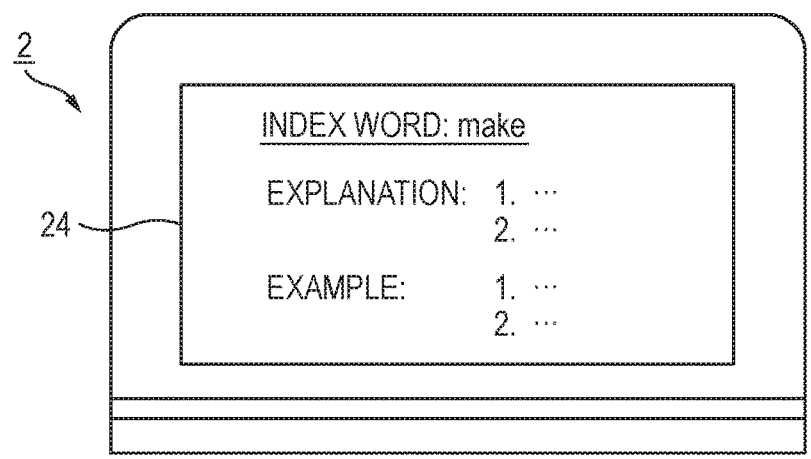
FIG. 8
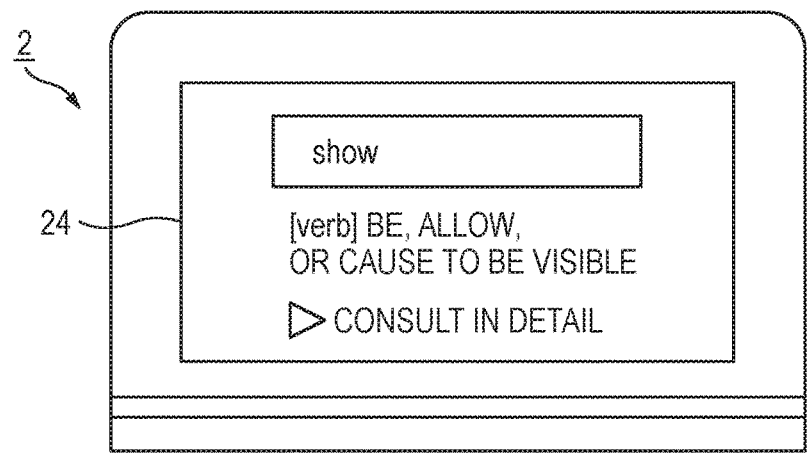

SEARCH INFORMATION

```
make
take
go
home
play
⋮
```
— 271

BROWSE INFORMATION — 272

| LEARNING CONTENT | CATEGORY | BROWSED STATE |
|---|---|---|
| CONTENT A | VOCABULARY | 100 % |
| CONTENT B | VOCABULARY | 10 % |
| CONTENT C | CONVERSATION | 70 % |
| CONTENT D | PRONUNCIATION | 0 % |
| ⋮ | | |

FIG. 13

SEARCH TERM LIST          431

| SEARCH TERM | SEARCH DATE AND TIME |
|---|---|
| make | 20XX/ 1/10 11:20 |
| take | 20XX/ 1/10 11:20 |
| go | 20XX/ 1/10 11:20 |
| home | 20XX/ 1/10 11:20 |
| play | 20XX/ 1/10 11:20 |
| ⋮ | ⋮ |

FIG. 14

CONTENT INFORMATION          435

| CONTENT A | CONTENT B | CONTENT C | ... |
|---|---|---|---|
| after<br>make<br>take<br>⋮ | play<br>but<br>sleep<br>⋮ | sleep<br>go<br>home<br>play<br>out<br>⋮ | ... |

INFORMATION PROCESSING SYSTEM, ELECTRONIC DEVICE, INFORMATION PROCESSING METHOD, AND RECORDING MEDIUM

CROSS-REFERENCE TO RELATED APPLICATIONS

This application claims the benefit of priority based upon prior Japanese patent application No. 2017-185004, filed on Sep. 26, 2017; the entire content of which is incorporated herein by reference.

TECHNICAL FIELD

The present invention relates to an information processing system, an electronic device, an information processing method, and a recording medium.

DESCRIPTION OF RELATED ART

Electronic devices capable of providing various contents such that users can browse the contents are known. For example, the instruction manual for XD-G4800 and XD-G4900 of the EX-word DATAPLUS 10 series of electronic dictionaries (CASIO COMPUTER CO., LTD.) published on the Internet (http://support.casio.jp/storage/pdf/003/XD-G4800_WA_JA.pdf) (searched on Aug. 28, 2017) discloses an electronic dictionary capable of providing learning contents such that a user can browse the learning contents. Specifically, on the electronic dictionary disclosed in Non-Patent Document 1, a user can select contents of a category according to a purpose from a plurality of contents stored inside, and learn the selected contents. Also, according to a learning plan which is a combination of a plurality of contents, the user can learn the corresponding contents.

However, it is required that in such a case where there is a plurality of contents which a user can browse, it be possible to more appropriately select contents to recommend to the user from the plurality of contents.

BRIEF SUMMARY

An data processing method related to one aspect of the present invention includes: selecting one or more contents from a first plurality of contents each of which includes a plurality of terms, based on a history of search terms and browsing states of the plurality of contents, the search terms having been searched for in a database storing a second plurality of terms and related information of each of the second plurality of terms; and outputting information representing the selected one or more contents.

An electronic device related to a first aspect of the present invention includes: a processor and a memory storing instructions that, when executed by the processor, cause the processor to: search for search terms in a database storing a plurality of terms and related information of each of the plurality of terms; output a content selected from a plurality of contents stored in the memory, so that the selected content is capable of being browsed; select one or more contents from the plurality of contents, based on a history of search terms that have been searched for and browsing states of the plurality of contents, the browsing states representing at least that the plurality of contents have been outputted such that the plurality of contents are capable of being browsed; and output information representing the selected one or more contents.

An electronic device related to a second aspect of the present invention includes: a processor; and a memory storing instructions that, when executed by the processor, cause the processor to: search for search terms in a database storing a plurality of terms and related information of each of the plurality of terms; output a content selected from a plurality of contents stored in the memory, such that the selected content is capable of being browsed; and transmit search information representing a history of search terms that have been searched for and browse information representing browsing states of the plurality of contents to one or more external devices, such that the one or more external devices are able to acquire the search information and the browse information. And the one or more external devices are configured to perform: selecting one or more contents from the plurality of contents, based on the search information and the browse information that are acquired from the electronic device; and transmitting information representing the selected one or more contents to the electronic device, such that the electronic device is capable of acquiring the selected one or more contents.

A non-transitory recording medium that is related to one aspect of the present invention and has a program recorded thereon that is executable to control a computer to: select one or more contents from a plurality of contents each of which includes a first plurality of terms, based on a history of search terms and browsing states of the plurality of contents, the search terms having been searched for in a database storing a second plurality of terms and related information of the each of the second plurality of terms; and output information representing the selected one or more contents.

BRIEF DESCRIPTION OF THE DRAWINGS

The components in the drawings are not necessarily to scale relative to each other.

FIG. 6 is a view illustrating examples of learning plans according to the embodiment of the present invention.

FIG. 7 is a view illustrating an example of a search result display screen which is displayed on the electronic device shown in FIG. 5.

FIG. 8 is a view illustrating an example of a learning content browsing screen which is displayed on the electronic device shown in FIG. 5.

FIG. 13 is a view illustrating an example of a search term list stored in the server shown in FIG. 12.

FIG. 14 is a view illustrating an example of content information stored in the server shown in FIG. 12.

DETAILED DESCRIPTION

Hereinafter, embodiments of the present invention will be described with reference to the drawings. Throughout the drawings, identical or equivalent parts are denoted by the same reference symbols.

Figure 1:
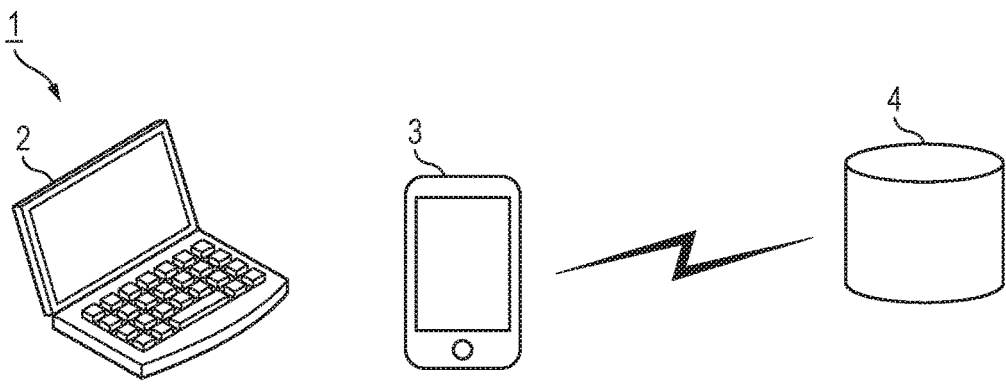
FIG. 1 is a view illustrating the overall configuration of an information processing system according to an embodiment of the present invention.

FIG. 1 shows the overall configuration of an information processing system 1 according to an embodiment of the present invention. The information processing system 1 is a system for supporting a user in learning by offering recommended learning contents for the user on the basis of the utilization state of an electronic device 2 by the user.

As shown in FIG. 1, the information processing system 1 includes the electronic device 2, a communication terminal 3, and a server 4. The communication terminal 3 and the server 4 are connected via a wide area network such as the Internet such that they can perform communication with each other.

Figure 2:
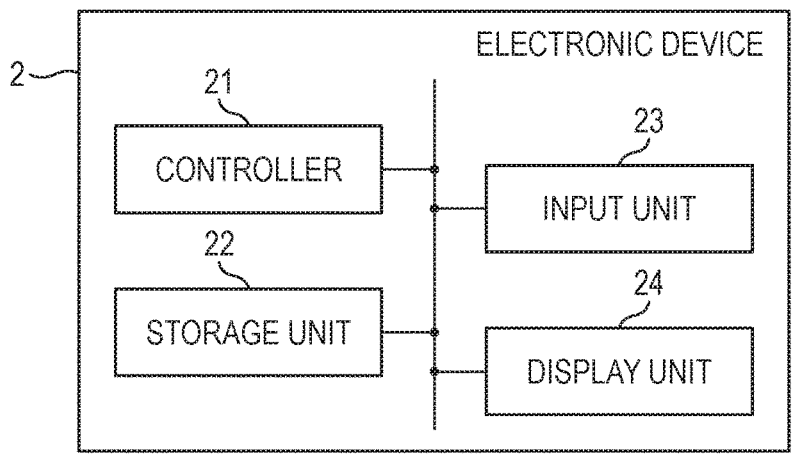
FIG. 2 is a block diagram illustrating the hardware configuration of an electronic device according to the embodiment of the present invention.

The electronic device 2 is a device which can be operated by the user. The electronic device 2 is, for example, a so-called electronic dictionary, and has various contents including dictionaries. As shown in FIG. 2, the electronic device 2 includes a controller 21, a storage unit 22, an input unit 23, and a display unit 24.

The controller 21 includes a CPU (Central Processing Unit), a ROM (Read Only Memory), and a RAM (Random Access Memory). The CPU is, for example, a microprocessor or the like, and is a central processing unit for performing various processes and arithmetic operations. In the controller 21, the CPU reads out a control program from the ROM, and controls the operation of the entire electronic device 2 while using the RAM as a work memory. The controller 21 serves as a control means (a device side control means).

The storage unit 22 is a non-volatile memory such as a flash memory or a hard disk. The storage unit 22 is for storing programs and data, including an OS (Operating System) and application programs, to be used in the controller 21 to perform various processes. Also, the storage unit 22 is for storing data which is generated or acquired when the controller 21 performs various processes.

The input unit 23 includes input devices such as input keys, buttons, switches, a touchpad, and a touch panel. The input unit 23 receives operation instructions input by the user, and transmits the received operation instructions to the controller 21.

The display unit 24 includes a display device such as a liquid crystal display or an organic EL (Electro-Luminescence) display. The display unit 24 is driven by a display driver circuit (not shown in the drawings), and displays various images according to states. However, the display unit 24 may be superimposed on the input unit 23, such that the display unit 24 and the input unit 23 constitute a so-called touch panel (touch screen).

Figure 3:
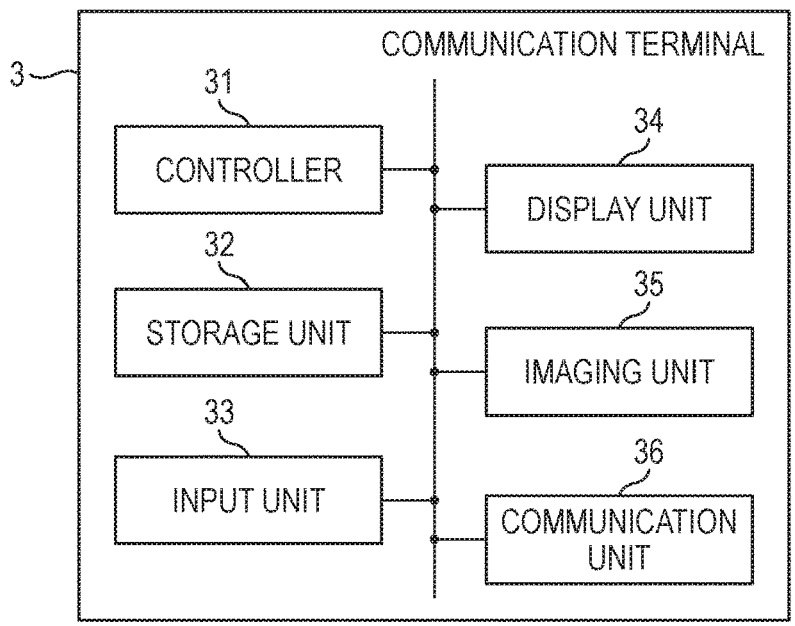
FIG. 3 is a block diagram illustrating the hardware configuration of a communication terminal according to the embodiment of the present invention.

The communication terminal 3 is a terminal device which can be operated by the user. The communication terminal 3 is specifically a mobile phone, a smart phone, a wearable device, or a tablet device, and is a portable information device which can be used while being held in a hand by the user. As shown in FIG. 3, the communication terminal 3 includes a controller 31, a storage unit 32, an input unit 33, a display unit 34, an imaging unit 35, and a communication unit 36.

The controller 31 includes a CPU, a ROM, and a RAM. In the controller 31, the CPU reads out a control program from the ROM, and controls the operation of the entire communication terminal 3 while using the RAM as a work memory. The controller 31 serves as a control means (a terminal side control means).

The storage unit 32 is a non-volatile memory such as a flash memory or a hard disk. The storage unit 32 is for storing programs and data, including an OS and application programs, to be used in the controller 31 to perform various processes. Also, the storage unit 32 is for storing data which is generated or acquired when the controller 31 performs various processes.

The input unit 33 includes input devices such as input keys, buttons, switches, a touchpad, and a touch panel. The input unit 33 receives operation instructions input by the user, and transmits the received operation instructions to the controller 31.

The display unit 34 includes a display device such as a liquid crystal display or an organic EL display. The display unit 34 is driven by a display driver circuit (not shown in the drawings), and displays various images according to states. However, the display unit 34 may be superimposed on the input unit 33, such that the display unit 34 and the input unit 33 constitute a so-called touch panel (touch screen).

The imaging unit 35 is a so-called camera, and includes a lens configured to focus light emitted from a subject, an imaging device such as a CCD (Charge-Coupled Device) configured to receive the focused light and acquire an image of the subject, and an image processing unit configured to process the image acquired by the imaging device. Specifically, the imaging unit 35 images a two-dimensional code such as a QR (Quick Response) code (registered as a trademark), and reads information represented by the imaged two-dimensional code, and provides the read information to the controller 31.

The communication unit 36 is a communication module for performing communication with external devices via an antenna (not shown in the drawings) under the control of the controller 31. The communication unit 36 accesses the wide area network via a wireless LAN (Local Area Network) such as Wi-Fi (Wireless Fidelity), and transmits information to the server 4, and receives information from the server.

Figure 4:
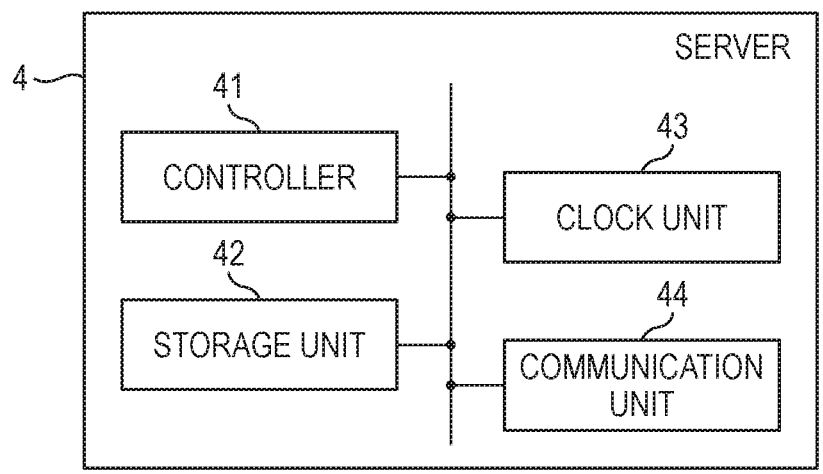
FIG. 4 is a block diagram illustrating the hardware configuration of a server according to the embodiment of the present invention.

The server 4 is, specifically, an information processing device such as a general-purpose computer or a cloud server, and is installed, for example, in the company or corporation which sold and manages the electronic device 2. The server 4 manages the utilization states of a plurality of electronic devices including the electronic device 2 by communication with a plurality of communication terminals including the communication terminal 3. As shown in FIG. 4, the server 4 includes a controller 41, a storage unit 42, a clock unit 43, and a communication unit 44.

The controller 41 includes a CPU, a ROM, and a RAM. In the controller 41, the CPU reads out a control program from the ROM, and controls the operation of the entire communication terminal 4 while using the RAM as a work memory. The controller 41 serves as a control means (a server side control means).

The storage unit 42 is a non-volatile memory such as a flash memory or a hard disk. The storage unit 42 is for storing programs and data, including an OS and application programs, to be used in the controller 41 to perform various processes. Also, the storage unit 42 is for storing data which is generated or acquired when the controller 41 performs various processes.

The clock unit 43 includes an RTC (Real Time Clock), and serves as a clock means for measuring time intervals.

The communication unit 44 is a communication module for performing communication with external devices via an antenna (not shown in the drawings) under the control of the controller 41. The communication unit 44 accesses the wide area network via a wireless LAN such as Wi-Fi, and transmits information to the communication terminal 3, and receives information from the communication terminal.

Figure 5:
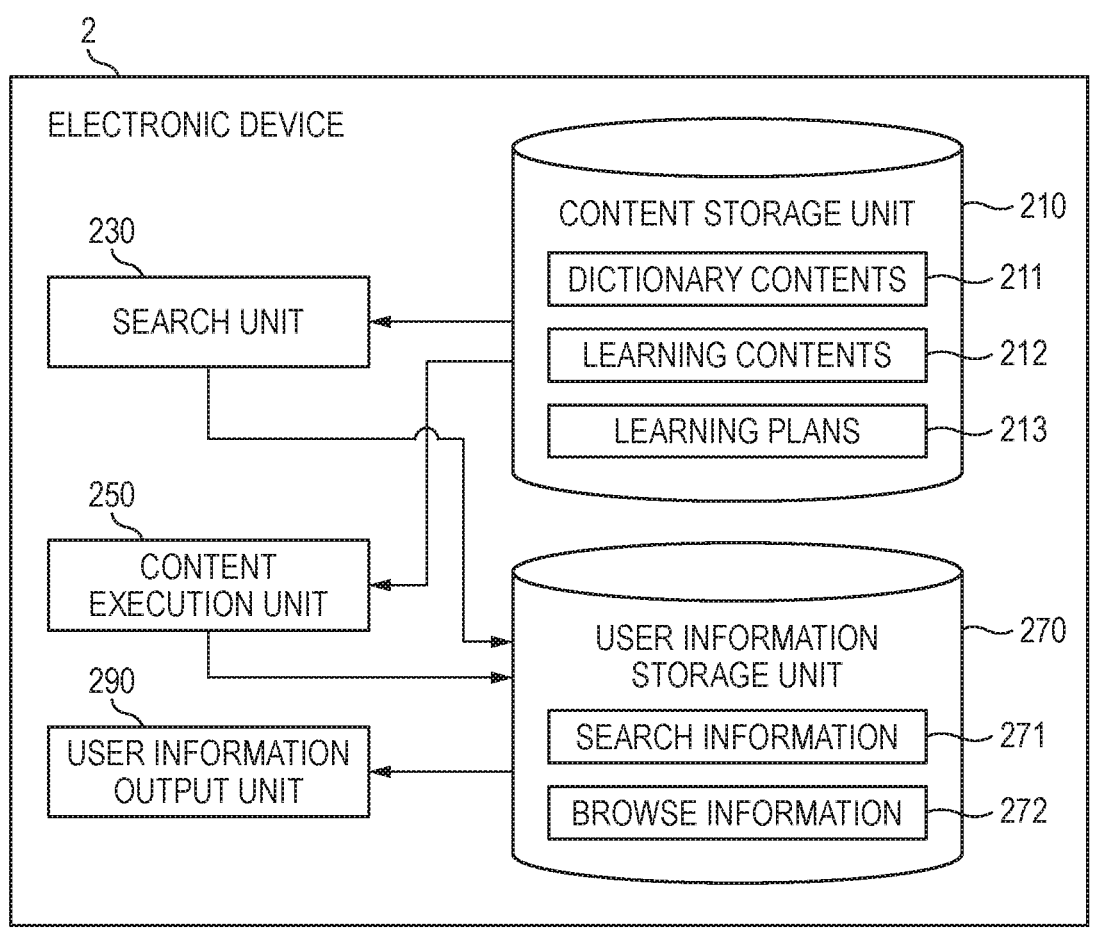
FIG. 5 is a block diagram illustrating the functional configuration of the electronic device according to the embodiment of the present invention.

Now, the functional configuration of the electronic device 2 will be described with reference to FIG. 5. As shown in FIG. 5, the electronic device 2 functionally includes a content storage unit 210, a search unit 230, a content execution unit 250, a user information storage unit 270, and a user information output unit 290. In the controller 21, the CPU serves as each of the search unit 230, the content execution unit 250, and the user information output unit 290 by reading a program from the ROM into the RAM and executing the read program. Also, the content storage unit 210 and the user information storage unit 270 are configured in appropriate storage areas of the storage unit 22.

In the content storage unit 210, a plurality of contents which the user can browse on the electronic device 2 is stored in advance. Contents are also referred to as digital contents, and each are a series of information, data, or programs combined for a specific purpose. Specifically, in the content storage unit 210, dictionary contents 211, learning contents 212, and learning plans 213 are stored in advance.

Dictionary contents 211 are databases including a plurality of terms and related information of the individual terms, and can be used as dictionaries by the user. The electronic device 2 has an English-Japanese dictionary, a Japanese-English dictionary, a German dictionary, a Chinese dictionary, a Japanese dictionary, a Chinese character dictionary, an encyclopedia, and so on, as dictionary contents 211. The individual dictionaries which are stored as dictionary contents 211 include information on headwords, explanations of the headwords, and usage examples of the headwords.

Learning contents 212 are contents for learning, i.e. contents which can be used by the user for learning. The electronic device 2 has contents for learning various subjects such as linguistics including English linguistics, Japanese language, history, mathematics, and so on, as learning contents 212. For example, learning contents 212 for learning English are classified into a plurality of categories, such as contents for learning vocabulary, contents for learning pronunciation, contents for learning conversation, and so on. Each of the plurality of learning contents 212 belongs to and is associated with any one of a plurality of predetermined categories.

Learning plans 213 are combinations of two or more contents of the plurality of learning contents 212 stored in the electronic device 2. In FIG. 6, examples of plans A to C each of which is one of the learning plans 213 are shown. As shown in FIG. 6, for example, the plan A is the combination of two learning contents 212, i.e. a content A and a content B, and the plan B is the combination of three learning contents 212, i.e. the content A, the content B, and a content C, and the plan C is the combination of two learning contents 212, i.e. the content C and a content D. As described above, each learning plan 213 is a set of two or more learning contents 212, such as contents having similar levels or contents having similar genres, considered as enhancing the user's learning if the user learns them at the same time.

The search unit 230 performs searches fir search words or phrases input by the user. Each search word or phrase is a word or a phrase (one or more words) for which the user wants to search. Hereinafter, search words or phrases will be referred to simply as search terms. In the case where the user wants to look up an English word, an English idiom, a Chinese character, or the like, the user inputs the desired search term by operating the input unit 23. Specifically, by operating the input unit 23, the user inputs a character string representing a desired search term, one character by one character, and confirms the input character string as a search term. If the search unit 230 receives the search term input in the above-mentioned way by the user, it searches the dictionary contents 211, and extracts a headword corresponding to the search term from dictionaries stored as the dictionary contents 211. A headword corresponding to an input search term is a headword having the same beginning as the search term, and in the case where a plurality of headwords corresponds to the search term, all of the headwords having the same beginning as that of the search term are displayed on the display unit 24. Then, the search unit 230 specifies one headword of the plurality of corresponding headwords on the basis of a user's operation, and displays information described in the dictionary contents 211 as an explanation and usage examples of the specified headword. However, headwords corresponding to a search term are not limited to headwords having the same beginning as that of the search term, and may be one or more headwords which are obtained by performing a search for matches with the same end that of the search term, a search for matches with the same parts as those of the search term, a search for exact matches, a fuzzy search, or the like. Also, in the case where the number of headwords corresponding to a search term and extracted as the result of a search is one, the extracted headword may be specified as a headword to be displayed on the display unit 24, such that an explanation and so on thereof is displayed.

FIG. 7 shows a display example of the display unit 24 in the case where an English word "make" has been input as a search term. In the case where the English word "make" has been input as a search term, the search unit 230 searches the English-Japanese dictionary of the dictionary contents 211, and displays an explanation and usage examples of the search term "make" described in the English-Japanese dictionary as the search result on the display unit 24. Such searching of the search unit 230 makes it possible for the user to look up a variety of information using the dictionary contents 211. The search unit 230 is implemented by cooperation of the controller 21 with the storage unit 22, the input unit 23, and the display unit 24. The search unit 230 serves as a searching means.

Referring to FIG. 5 again, if the user selects and designates a content from the plurality of contents stored in the content storage unit 210, the content execution unit 250 performs the corresponding content. Specifically, in the case where the user wants to learn using the learning contents 212 stored in the electronic component 102, the user designates a desired learning content 212 by operating the input unit 23. If the user designates a learning content 212, the content execution unit 250 reads out the designated learning content 212 from the content storage unit 210, and executes the designated learning content 212 and outputs the designated learning content such that the user can browse the designated learning content. Also, in the case where the user designates a learning plan 213, the content execution unit 250 sequentially executes a plurality of learning contents 212 included in the designated learning plan 213.

FIG. 8 shows a display example of the display unit 24 of the electronic device 2 in the case where an English word learning content 212 has been designated. As shown in FIG. 8, in the case where the English word learning content 212 has been designated, the content execution unit 250 displays a screen for learning an English word included in the designated learning content 212 on the display unit 24 such that the user can browse it. By browsing such display screens, the user can brow and learn a desired learning content 212. The content execution unit 250 is implemented by cooperation of the controller 21 with the storage unit 22, the input unit 23, and the display unit 24. The content execution unit 250 serves as a content executing means.

The results of searches by the search unit 230 and the results of execution of learning contents 212 by the content execution unit 250 are stored as search information 271 and browse information 272 in the user information storage unit 270, respectively. The search information 271 and the browse information 272 are referred to collectively as user information.

Figures 9, 10, 11:
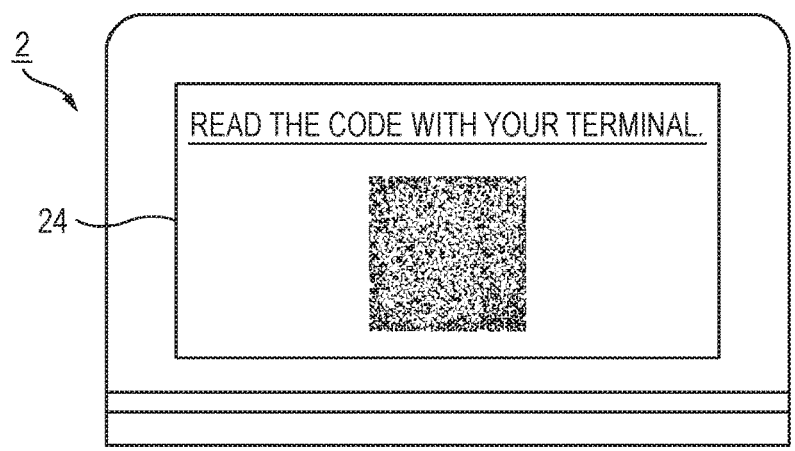
FIG. 9 is a view illustrating an example of search information stored in the electronic device shown in FIG. 5.
FIG. 10 is a view illustrating an example of browse information stored in the electronic device shown in FIG. 5.
FIG. 11 is a view illustrating an example of a two-dimensional code display screen which is displayed on the electronic device shown in FIG. 5.

The search information 271 is information representing the history of search terms which have been input by the user and have been specified by the search unit 230 and of which related information has been output. For example, FIG. 9 shows search information 271 in the case where English words "make", "take", "go", "home", "play", and so on have been searched for as search terms. Whenever searching the dictionary contents 211 for a search term input by the user, the search unit 230 updates the search term history by adding the search term to the search information 271.

The browse information 272 is information representing the browsing states of the plurality of learning contents 212 stored in the content storage unit 210. The browsing states are the states representing how much the user has browsed the learning contents 212 for learning, and can be referred to as progress in learning the learning contents 212. For example, in the case where a learning content 212 includes a plurality of questions, the browsing state is expressed by the number or ratio of questions answered correctly by the user. Also, in the case where a learning content 212 includes a plurality of audio data items, the browsing state is expressed by the number or ratio of audio data items reproduced by the user. Also, in the case where a learning content 212 includes a plurality of pages or items, the browsing state is expressed by the number or ratio of pages or items browsed by the user, i.e. displayed on the display unit 24.

Specifically, as shown in FIG. 10, browse information 272 of each of the plurality of learning contents 212 stored in the content storage unit 210 includes information on a category including the corresponding learning content, and information on a ratio between 0% and 100% representing the browsing state. Here, the case where the browsing state of a learning content 212 (in the example of FIG. 10, the content D) is 0% means that the user never has browsed the corresponding learning content and has not started to learn the corresponding learning content. Meanwhile, the case where the browsing state of a learning content 212 (in the example of FIG. 10, the content A) is 100% means that the user has browsed all of the corresponding learning content and has completely learned the corresponding learning content.

As described above, the browse information 272 of each of the plurality of learning contents 212 is information representing whether the user has browsed the corresponding learning content and how much the user has browsed the corresponding learning content, and is progress information representing progress in learning. Whenever executing a learning content 212 designated by the user (i.e. whenever outputting a learning content such that the user can browse the learning content), the content execution unit 250 updates the browse information 272 according to the browsing state of the executed learning content 212.

Referring to FIG. 5 again, the user information output unit 290 outputs a two-dimensional code representing user information stored in the user information storage unit 270, i.e. the search information 271 and the browse information 272. The two-dimensional code is, for example, a QR code (registered as a trademark), and is a code expressing information by a distribution pattern of black and white cells arranged in a square (in a matrix).

Specifically, in the case where the user wants to be supported in learning by the information processing system 1, the user inputs an instruction to output user information via the input unit 23. If receiving the instruction to input user information, the user information output unit 290 reads out the latest search information 271 and the latest browse information 272 from the user information storage unit 270. Subsequently, the user information storage unit 270 generates a two-dimensional code representing the read search information 271 and the read browse information 272, and outputs the generated two-dimensional code on the display unit 24 as shown in FIG. 11. In this case, information which is represented by the two-dimensional code may include the identification information of the electronic device 2 or the user, the current date and time, and so on.

As described above, the user information output unit 290 is implemented by cooperation of the controller 21 with the storage unit 22 and the display unit 24. The user information output unit 290 serves as a user information output means. Also, the display unit 24 serves as a display means for displaying two-dimensional codes.

Figure 12:
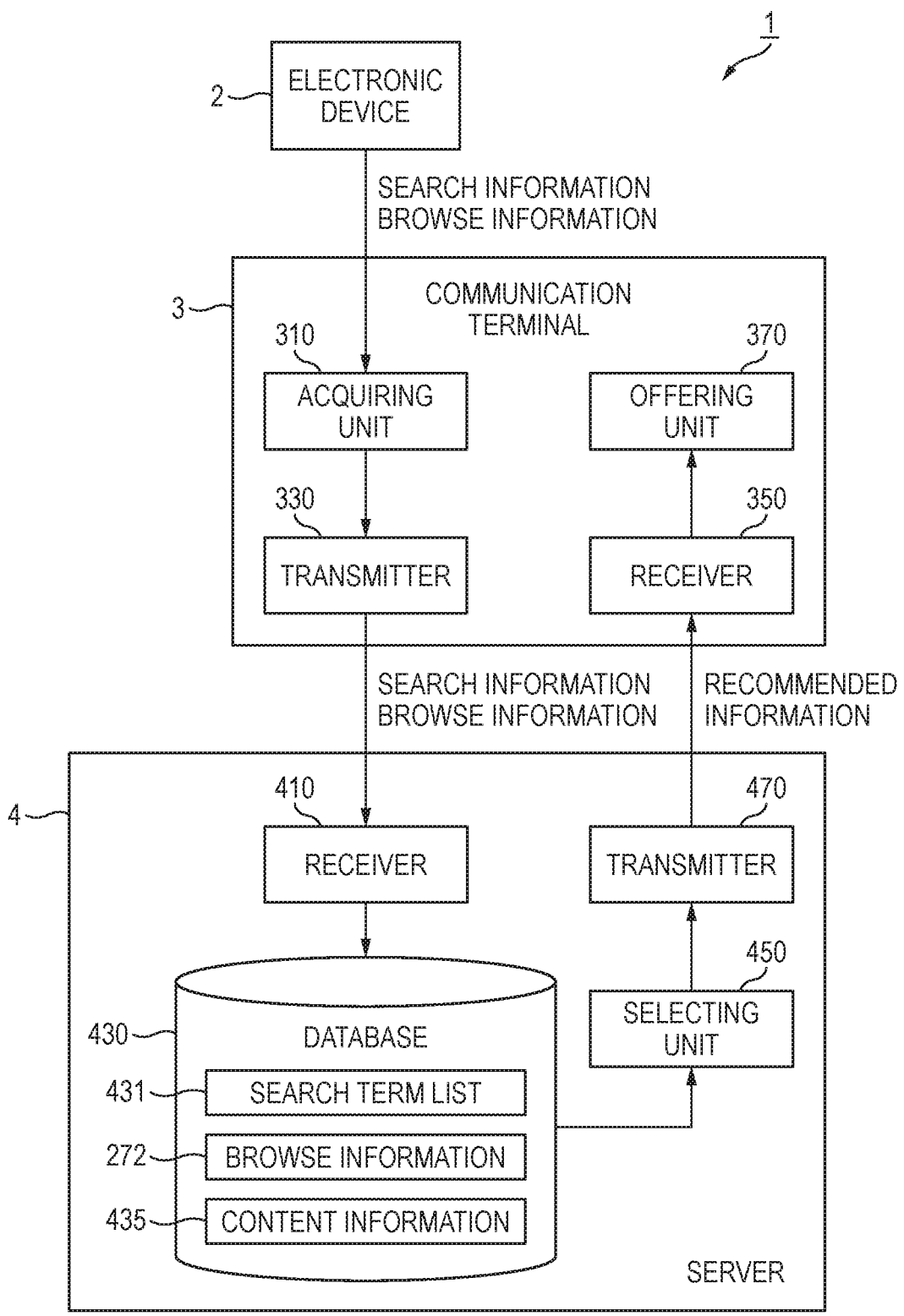
FIG. 12 is a block diagram illustrating the functional configurations of the communication terminal and the server according to the embodiment of the present invention.

Now, the functional configurations of the communication terminal 3 and the server 4 will be described with reference to FIG. 12. As shown in FIG. 12, the communication terminal 3 functionally includes an acquiring unit 310, a transmitter 330, a receiver 350, and an offering unit 370. In the controller 31, the CPU serves as the individual units by reading a program from the ROM into the RAM and executing the read program.

The acquiring unit 310 acquires the search information 271 and the browse information 272 from the electronic device 2. Specifically, the user grips the electronic device 2 or the communication terminal 3 and moves it, such that the two-dimensional code displayed on the display unit 24 of the electronic device 2 comes into the view field of the imaging unit 35 of the communication terminal 3. In this state, the user images the two-dimensional code by the imaging unit 35 by operating the input unit 33. The acquiring unit 310 reads the information represented by the two-dimensional code imaged by the imaging unit 35 by analyzing the two-dimensional code.

As described above, the acquiring unit 310 acquires the search information 271 and the browse information 272 by reading the two-dimensional code displayed on the display unit 24 of the electronic device 2 by the imaging unit 35. Since such two-dimensional codes are used, even though the electronic device 2 does not have a function of performing wire or wireless communication with the outside, the communication terminal 3 can easily acquire information from the electronic device 2. The acquiring unit 310 is implemented by cooperation of the controller 31 with the imaging unit 35. The acquiring unit 310 serves as an acquiring means.

The transmitter 330 transmits the search information 271 and the browse information 272 acquired by the acquiring unit 310 to the server 4. Specifically, if the acquiring unit 310 acquires the search information 271 and the browse information 272 from the electronic device 2, the transmitter 330 transmits the acquired search information 271 and the acquired browse information 272 to the server 4 by communication with the server 4 via the communication unit 36 and the wide area network. The transmitter 330 is implemented by cooperation of the controller 31 with the communication unit 36. The transmitter 330 serves as a terminal side transmitting means.

The server 4 functionally includes a receiver 410, a selecting unit 450, and a transmitter 470. In the controller 41, the CPU serves as the individual units by reading a program from the ROM into the RAM and executing the program. Also, the server 4 has a database 430. The database 430 is built in an appropriate storage area of the storage unit 42.

If the search information 271 and the browse information 272 are transmitted from the communication terminal 3. The receiver 410 receives the transmitted search information 271 and the transmitted browse information 272. The receiver 410 is implemented by cooperation of the controller 41 with the communication unit 44. The receiver 410 serves as a server side receiving means.

If the receiver 410 receives the search information 271 and the browse information 272 from the communication terminal 3, the database 430 is updated with the received search information 271 and the received browse information 272. The database 430 includes a search term list 431, browse information 272, and content information 435.

The search term list 431 is information on the history of search terms represented by the search information 271 received from the communication terminal 3, and is a list of search terms which the electronic device 2 has searched for. Specifically, as shown in FIG. 13, the search term list 431 is a list including search terms which the electronic device 2 has searched for, and the search dates and times of the individual search terms, stored in association with each other. If the receiver 410 receives the search information 271 from the communication terminal 3, it adds a history of a search term represented by the received search information 271 to the search term list 431. At this time, the receiver 410 stores the date and time when the search information 271 was received from the communication terminal 3, as the search date and time, in the search term list 431. Therefore, in the search term history, the search terms and the times when the search terms were searched for are associated with each other. As the search dates and times of a plurality of search terms which are added to the search term list 431 on the basis of the same search information 271, the same date and time is stored.

Also, in the case where a plurality of search terms represented by newly received search information 271 includes a search term already stored in the search term list 431, the receiver 410 updates the search date and time of the corresponding search term in the search term list 431 by overwriting. Also, if the receiver 410 receives browse information 272 from the communication terminal 3, it updates the browse information 272 already stored in the database 430 with the received browse information 272.

The content information 435 is information on learning contents 212 and learning contents 212 which can be used on the electronic device 2. Specifically, the content information 435 is information on the learning contents 212, and includes information on terms included in the plurality of learning contents 212. In the case where a learning content 212 is a content for learning English, for example, if the learning content 212 is a content for learning vocabulary, terms included in the learning content 212 are English words, English idioms, and so on described as vocabulary; whereas if the learning content 212 is a content for learning pronunciation or conversation, terms included in the learning content are English words, English idioms, and so on included in scripts.

In FIG. 14, examples of terms which are included in a plurality of learning contents 212 are shown. As shown in FIG. 14, the content information 435 includes information on English words described in each of the plurality of learning contents 212. Also, the content information 435 includes information on the correspondence relation between the learning plans 213 and the learning contents 212 shown in FIG. 6, as information related to the learning plans 213.

Referring to FIG. 12 again, the selecting unit 450 selects one or more contents to be recommended, from a plurality of learning contents 212 which the user can browse and use, on the basis of the history of search terms input by the user, and the browsing states of the plurality of learning contents 212 by the user. Contents to be recommended are learning contents 212 to be recommended for user's browsing and learning. As described above, the electronic device 2 has the plurality of learning contents 212 which the user can browse. Some users may have difficulty in grasping which contents of the plurality of learning contents 212 they need to browse, by themselves. For this reason, for the user, the server 4 selects a learning content 212 considered as a content which the user needs to browse and learn, as a content to be recommended, and offers the recommended content to the user.

In order to select a content to be recommended, the selecting unit 450 refers to the search term list 431, the browse information 272, and the content information 435 stored in the database 430. The selecting unit 450 is implemented by cooperation of the controller 41 with the storage unit 42. The selecting unit 450 serves as a selecting means.

The selecting unit 450 selects a content to be recommended, on the basis of the number of search terms which have been input by the user and are included in each of the plurality of learning contents 212. Specifically, with reference to the search term list 431 and the content information 435 stored in the database 430, the selecting unit 450 compares the search terms included in the search term list 431 with terms included in each of the plurality of learning contents 212. Also, the selecting unit 450 counts the number of search terms in the search term list 431 which are included in each of the plurality of learning contents 212.

Specifically, in the examples of FIG. 13 and FIG. 14, of the search terms included in the search term list 431, search terms "make" and "take" are included in the content A, and a search term "play" is included in the content B, and search terms "home" and "play" are included in the content C. As described above, with respect to the search terms of the search term list 431, the selecting unit 450 counts the number of search terms included in each of the plurality of learning contents 212, i.e. the number of matches in the corresponding learning content.

More specifically, the selecting unit 450 selects a content to be recommended, on the basis of the numbers of search terms which have been input by the user in a prescribed period in the past and are included in the plurality of individual learning contents 212. In other words, the selecting unit 450 selects a content to be recommended, on the basis of the number of matches between a plurality of terms included in each of the plurality of learning contents 212 and the search terms included in the search term list 431 and associated with the prescribed period. The prescribed period in the past is a past period having a prescribed length (for example, the latest one-month period) with reference to that point in time. If the search date and time of a search term included in the search term list 431 is a long time ago, the possibility that the search term does not appropriately reflect the current state of the user such as the learning level and so on is high. For this reason, the selecting unit 450 limits search terms for selecting a content to be recommended, to search terms input in the prescribed period in the past. Specifically, the selecting unit 450 counts the number of search terms associated with search dates and times included in the prescribed period in the past (for example, the latest three-month period), of the search terms included in the search term list 431, as the number of search terms (the number of matches) included in each of the plurality of learning contents 212.

If counting the number of search terms (the number of matches) included in each of the plurality of learning contents 212, the selecting unit 450 selects candidate contents as candidates for contents to be recommended, from the plurality of learning contents 212, on the basis of the numbers of search terms counted. Specifically, with respect to each of the plurality of learning contents 212, the selecting unit 450 determines whether the number of search terms included in the corresponding learning content exceeds a certain value. Then, the selecting unit 450 selects learning contents 212 having the numbers of search terms exceeding the certain value, as candidate contents. As the certain value, a value for each search term list 431 may be determined in advance, or a value may be calculated for each search term list 431 on the basis of the total number of search terms included in the corresponding search term list 431 and a predetermined ratio (for example, 30%).

In the case where the number of learning contents 212 having the numbers of search terms exceeding the certain value is two or more, the selecting unit 450 selects a learning content 212 having the largest number of search terms as a candidate content. In other words, the selecting unit 450 selects a content having the number of search terms which exceeds the certain value and is largest, as a candidate content, from the plurality of learning contents 212.

The reason why a learning content 212 including more search terms is selected as a candidate content as described above is that such a learning content 212 includes more terms which the user wants to look up. In other words, the reason is that a learning content 212 including more search terms is likely to be a content appropriate for the learning level and current state of the user and be a content appropriate for the user.

If selecting candidate contents, the selecting unit 450 selects a content to be recommended, on the basis of their browsing states. Specifically, the selecting unit 450 refers to the browse information 272 stored in the database 430. The database 430 includes the browse information 272 received from the communication terminal 3, for example, as shown in FIG. 10. The selecting unit 450 checks the browsing states of the candidate contents, included in the browse information 272 stored in the database 430. In the case where the browsing state of a candidate content is not 100%, i.e. browsing of the candidate content has not been completed, the selecting unit 450 selects the candidate content as a content to be recommended. The case where browsing has not been completed includes the case where the candidate content never have been browsed, i.e. the browsing state is 0%.

Meanwhile, in the case where the browsing state of a candidate content is 100%, i.e. browsing of the candidate content has been completed, the possibility that it is unnecessary to recommend the candidate content to the user is high. For this reason, in the case where browsing of a candidate content has been completed, the selecting unit 450 does not select the candidate content as a content to be recommended. By referring to the browsing state as described above, it is possible to suppress learning contents 212 unnecessary for the user from being recommended.

If selecting a content to be recommended as described above, subsequently, the selecting unit 450 selects a learning plan 213 including the recommended content, as a plan to be recommended (a combination to be recommended), from the plurality of learning plans 213. A plan to be recommended is a learning plan 213 to be recommended for user's browsing and learning.

With reference to the information on the learning plans 213 included in the content information 435, the selecting unit 450 determines whether there is any learning plan 213 including the recommended content in the plurality of learning plans 213 which the user can browse on the electronic device 2. In the case where there is a learning plan 213 including the recommended content, the selecting unit 450 selects the corresponding learning plan 213 as a plan to be recommended. For example, in a state where the learning plans 213 and the learning contents 212 correspond to each other as shown in FIG. 6, if the content C is selected as a content to be recommended, the selecting unit 450 selects the plan C including the content C as a plan to be recommended.

In the case where there are two or more learning plans 213 including the recommended content in the plurality of learning plans 213 which the user can browse on the electronic device 2, the selecting unit 450 selects a plan to be recommended, on the basis of the numbers of search terms which have been input by the user and are included in the plurality of individual learning plans 213 including the recommended content. Specifically, with respect to each of the plurality of learning plans 213 including the recommended content, the selecting unit 450 calculates the average number of search terms included in two or more learning contents 212 which are parts of the corresponding plan.

For example, in the case where one of the plurality of learning plans 213 including the recommended content is the combination of the content C and the content D, the selecting unit 450 calculates the average of the number of search terms included in the content C and the number of search terms included in the content D. With respect to each of the plurality of learning plans 213 including the recommended content, the selecting unit 450 calculates the average number of search terms. Then, the selecting unit 450 selects a learning plan 213 having the largest average as a plan to be recommended.

Referring to FIG. 12 again, in the server 4, the transmitter 470 transmits recommended information representing the content selected as a content to be recommended by the selecting unit 450, to the communication terminal 3. Specifically, the transmitter 470 performs communication with the communication terminal 3 via the communication unit 44 and the wide area network. Also, the transmitter 470 transmits the recommended information, as the response to the search information 271 and the browse information 272 transmitted from the communication terminal 3, to the communication terminal 3.

Also, in the case where a plan to be recommended has been selected, the transmitter 470 transmits information representing not only the recommended content but also the recommended plan, as recommended information, to the communication terminal 3. The transmitter 470 is implemented by cooperation of the controller 41 with the communication unit 44. The transmitter 470 serves as a server side transmitting means.

If the recommended information is transmitted from the server 4, in the communication terminal 3, the receiver 350 receives the transmitted recommended information. The receiver 350 is implemented by cooperation of the controller 31 with the communication unit 36. The receiver 350 serves as a terminal side receiving means.

Figure 15:
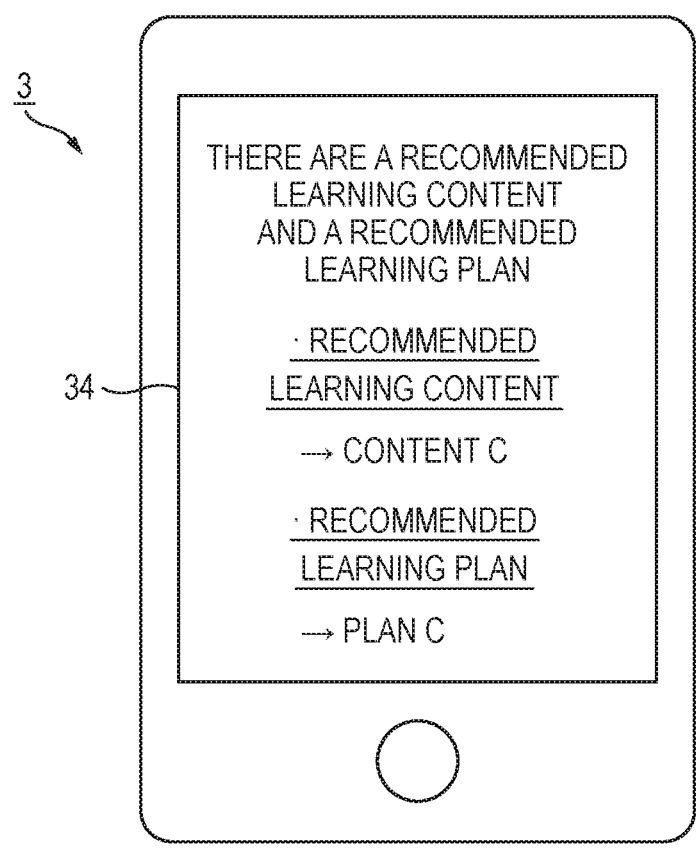
FIG. 15 is a view illustrating an example of a content offering screen which is displayed on the communication terminal shown in FIG. 12.

The offering unit 370 offers the recommended content represented by the recommended information received by the receiver 350, to the user. In this way, the offering unit 370 outputs information representing one or more contents selected as contents to be recommended by the selecting unit 450. Specifically, the offering unit 370 displays a screen offering the recommended content on the display unit 34 of the communication terminal 3 as shown in FIG. 15. In this case, if the recommended information received by the receiver 350 includes a recommended plan, the offering unit 370 offers the recommended plan together with the recommended content.

By offering the recommended content and the recommended plan as described above, the offering unit 370 suggests the learning content 212 and the learning plan 213 necessary for user's learning, of the plurality of learning content 212 and the plurality of learning plans 213. The user can select the offered learning content 212 or learning plan 213, and browse and learn it. The offering unit 370 is implemented by cooperation of the controller 31 with the display unit 34. The offering unit 370 serves as an offering means.

The flow of processing which is performed by the information processing system 1 having the above-described configuration will be described with reference to FIG. 16, FIG. 17, and FIG. 18.

Figure 16:
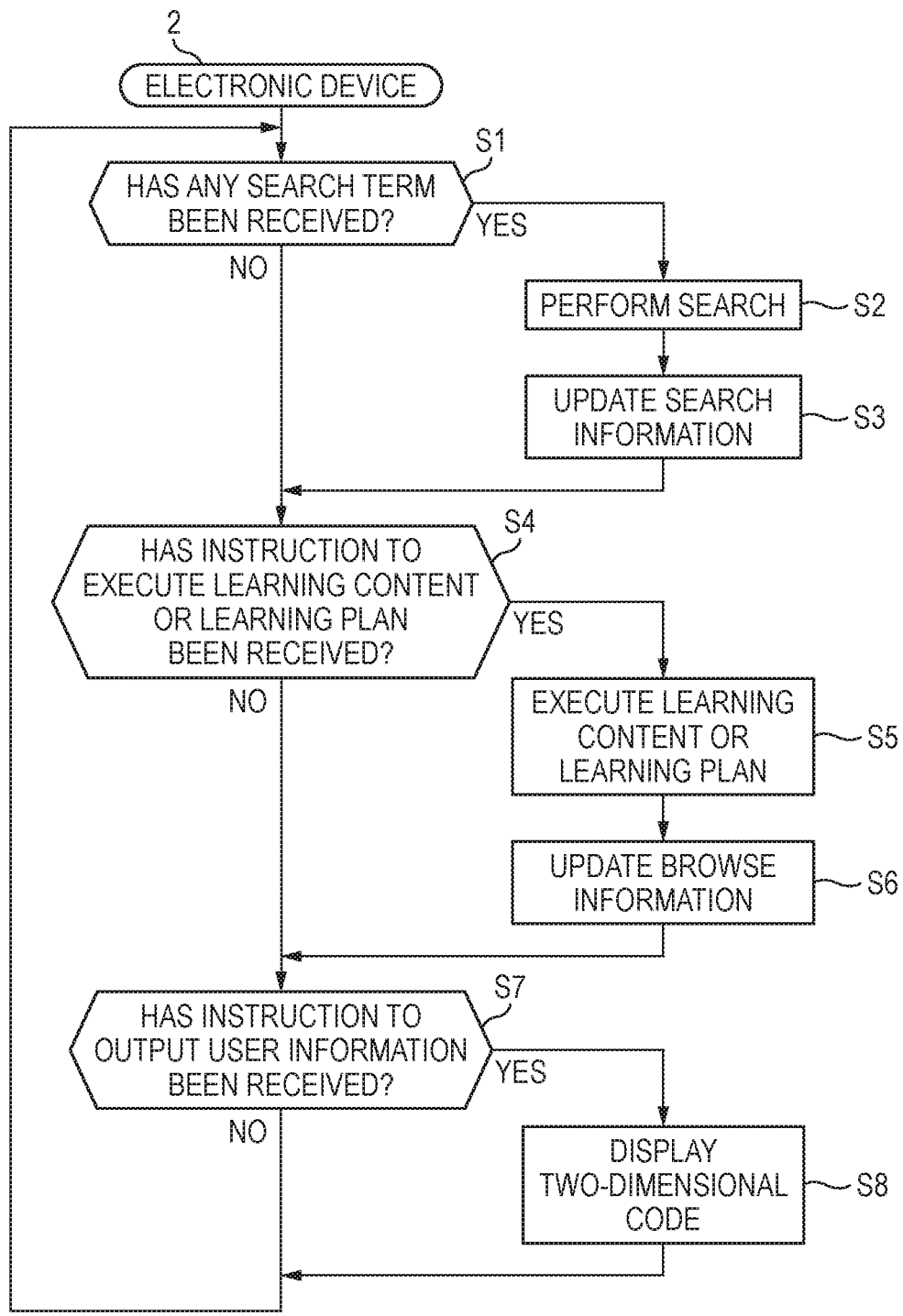
FIG. 16 is a flow chart illustrating the flow of processing which is performed by the electronic device according to the embodiment of the present invention.

FIG. 16 shows the flow of processing which is performed by the electronic device 2. The processing shown in FIG. 16 is performed if necessary when the electronic device 2 is on and can perform its normal operation.

If the processing shown in FIG. 16 starts, first, the controller 21 determines whether any search term has been received from the user via the input unit 23 (STEP S1). In the case where a search term has been received ("YES" in STEP S1), the controller 21 performs a search on the basis of the input search term by serving as the search unit 230 (STEP S2). Specifically, the controller 21 extracts and specifies one headword matching the search term, from the dictionary contents 211, or extracts a plurality of headwords matching the search term and specifies of one headword on the basis of a user's operation. Then, the controller displays an explanation and usage examples corresponding to the specified headword on the display unit 24 as shown in FIG. 7.

If performing a search, the controller 21 updates the search information 271 stored in the user information storage unit 270 (STEP S3). Specifically, the controller 21 updates the search term history by adding the search term searched for in STEP S2 to the search information 271.

After updating of the search information 271, or in the case where it is determined in STEP S1 that any search term has not been received ("NO" in STEP S1), subsequently, the controller 21 determines whether an instruction to execute a learning content 212 or a learning plan 213 has been received from the user via the input unit 23 (STEP S4).

In the case where an instruction to execute a learning content 212 or a learning plan 213 has been received ("YES" in STEP S4), the controller 21 performs the instructed learning content 212 or learning plan 213 by serving as the content execution unit 250 (STEP S5). Specifically, according to the instructed learning content 212 or learning plan 213, the controller 21 displays learning screens, for example, as shown in FIG. 8, on the display unit 24 such that the user can browse them. Therefore, the user can perform learning according the desired learning content 212 or learning plan 213.

If executing the learning content 212 or the learning plan 213, the controller 21 updates the browse information 272 stored in the user information storage unit 270 (STEP S6). Specifically, according to the status such as whether the learning content 212 or the learning plan 213 performed in STEP S5 was interrupted or has been completed, the controller 21 updates the browsing state of the corresponding learning content 212 included in the browse information 272.

After updating of the browse information 272, or in the case where it is determined in STEP S4 that an instruction to execute the learning content 212 or the learning plan 213 has not been received ("NO" in STEP S4), subsequently, the controller 21 determines whether an instruction to output user information has been received from the user via the input unit 23 (STEP S7).

In the case where an instruction to output user information has been received ("YES" in STEP S7), the controller 21 generates a two-dimensional code representing the search information 271 and the browse information 272 stored in the user information storage unit 270 by serving as the user information output unit 290. Subsequently, the controller 21 displays the generated two-dimensional code on the display unit 24 as shown in FIG. 11 (STEP S8).

If the two-dimensional code is displayed, or in the case where it is determined in STEP S7 that an instruction to output user information has not been received ("NO" in STEP S7), the controller 21 returns to STEP S1 of the processing. As described above, according to inputs received from the user, the controller 21 appropriately performs a search, and executes a learning content 212, and outputs a two-dimensional code representing user information.

Figure 17:
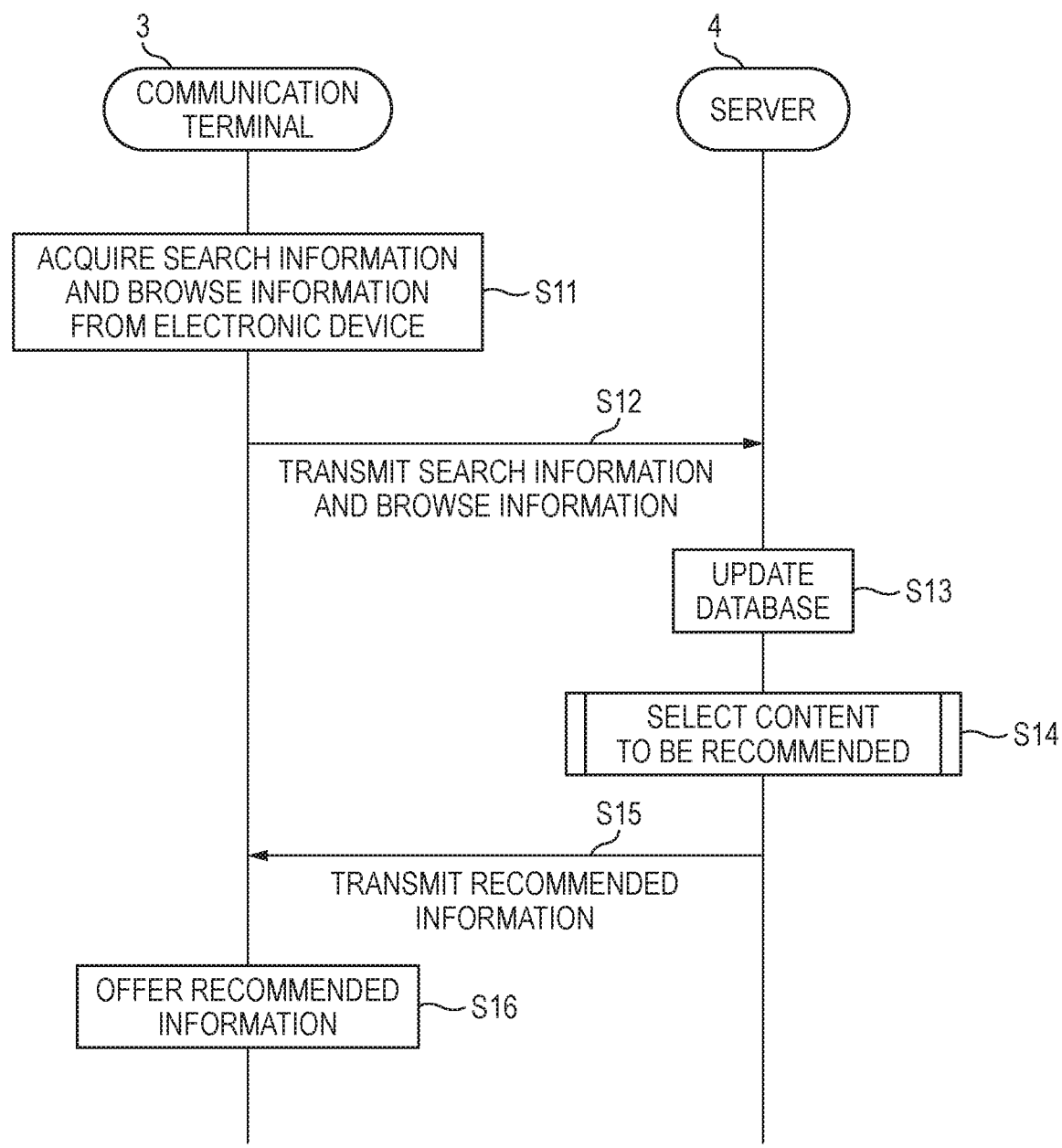
FIG. 17 is a sequence diagram illustrating the flow of processing which is performed by the communication terminal and the server according to the embodiment of the present invention.

FIG. 17 shows the flow of processing which is performed between the communication terminal 3 and the server 4. In the state where a two-dimensional code is displayed on the display unit 24 of the electronic device 2, if the mode of the communication terminal 3 transitions to a mode for reading two-dimensional codes, the processing shown in FIG. 17 starts.

If the processing shown in FIG. 17 is started, in the communication terminal 3, the controller 31 acquires the search information 271 and the browse information 272 by serving as the acquiring unit 310 (STEP S11). Specifically, the controller 31 reads the two-dimensional code displayed on the display unit 24 of the electronic device 2 by the imaging unit 35, thereby acquiring the search information 271 and the browse information 272 represented by the two-dimensional code.

If acquiring the search information 271 and the browse information 272 from the electronic device 2, the controller 31 transmits the acquired search information 271 and the acquired browse information 272 to the server 4 by serving as the transmitter 330 (STEP S12). In the server 4, the controller 41 receives the search information 271 and the browse information 272 transmitted from the electronic device 2 by serving as the receiver 410.

If receiving the search information 271 and the browse information 272, the controller 41 updates the database 430 (STEP S13). Specifically, the controller 41 accumulates the search term history by adding the history of the search term represented by the received search information 271 to the search term list 431. Also, the controller 41 stores the received browse information 272 in the database 430.

If updating the database 430, the controller 41 selects a content to be recommended from the plurality of learning contents 212 which the user can browse, by serving as the selecting unit 450 (STEP S14). The details of the process of selecting a content to be recommended will be described with reference to a flow chart shown in FIG. 18.

Figure 18:
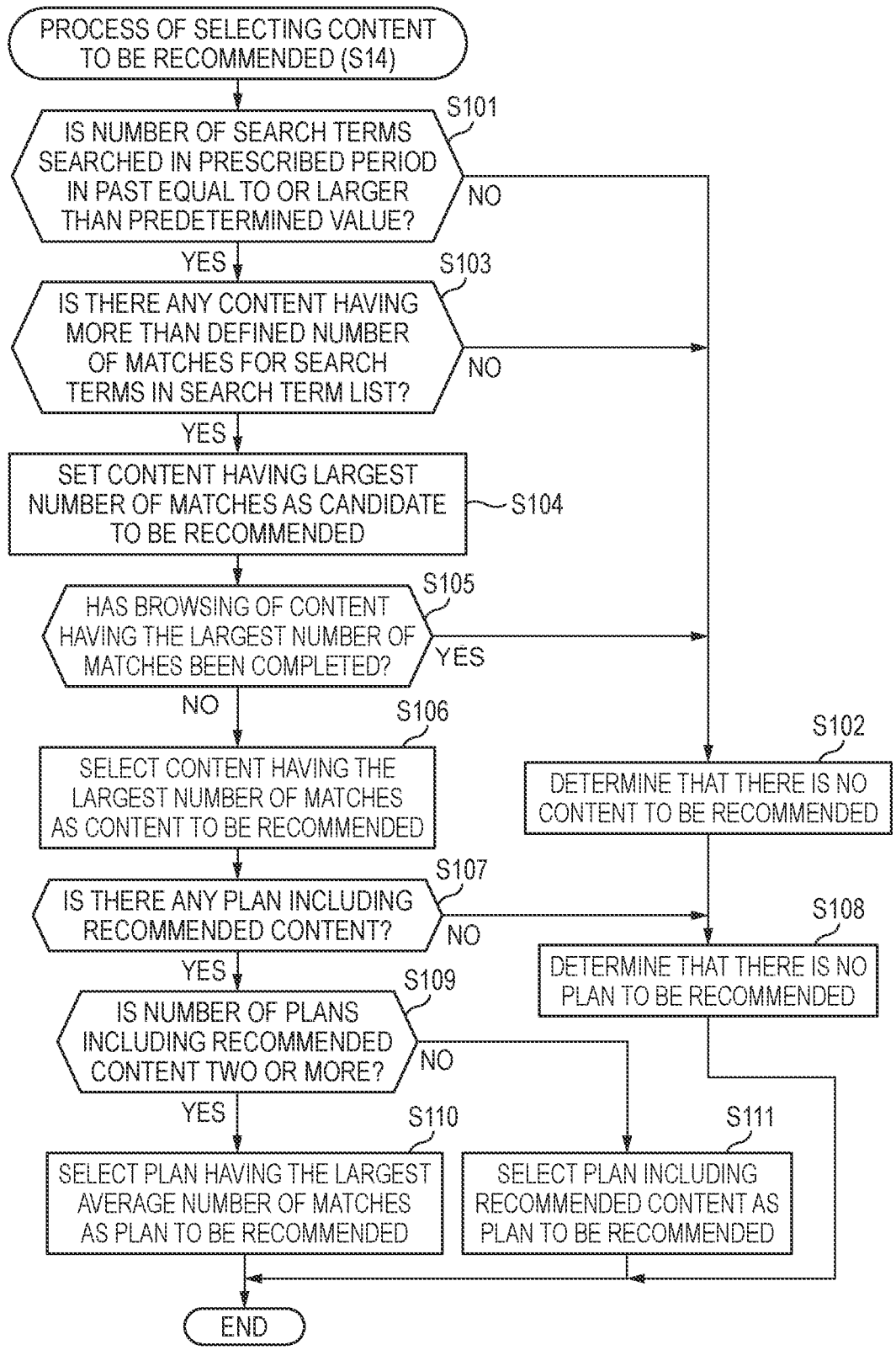
FIG. 18 is a flow chart illustrating the flow of a process of selecting a content to be recommended which is performed by the server according to the embodiment of the present invention.

If starting the process of selecting a content to be recommended, shown in FIG. 18, the controller 41 determines whether the number of search terms associated with a prescribed period in the past is equal to or larger than a predetermined value or not (STEP S101). Specifically, the controller 41 counts the number of search terms associated with search dates and times included in the prescribed period in the past with reference to that point in time, of the search terms included in the search term list 431. Then, the controller 41 determines whether the number of search terms associated with the prescribed period in the past is equal to or larger than the predetermined value (for example, 100) or not.

In the case where the number of search terms associated with the prescribed period in the past is smaller than the predetermined value ("NO" in STEP S101), the controller 41 determines that there is no content to be recommended (STEP S102). In the case where the number of search terms associated with the prescribed period in the past is small, since the amount of information representing the current state of the user such as the learning level is small, it is difficult to select a content to be recommended, appropriate for the current state of the user. For this reason, in this case, the controller 41 does not select a content to be recommended.

In contrast, in the case where the number of search terms associated with the prescribed period in the past is equal to or larger than the predetermined value ("YES" in STEP S101), the controller 41 determines whether there is any learning content 212 having the number of matches for the search terms included in the search term list 431 exceeding a defined value (STEP S103).

Specifically, with respect to each of the plurality of learning contents 212, the controller 41 counts the number of matches for the search terms included in the search term list 431, with reference to the search term list 431 and the content information 435 stored in the database 430. At this time, the controller 41 limits search terms which should be counted, to search terms associated with search dates and times included in the prescribed period in the past, of the search terms included in the search term list 431. Subsequently, the controller 41 determines whether there is at least one learning content 212 having the number of matches for the search terms exceeding the defined value. The defined value is a ratio to the total number of search terms included in the search term list 431 (for example, 30%).

In the case where there is no learning content 212 having the number of matches for the search terms exceeding the defined value ("NO" in STEP S103), the controller 41 proceeds to STEP S102 of the processing, and determines that there is no content to be recommended.

In contrast, in the case where there is any learning content 212 having the number of matches for the search terms exceeding the defined value ("YES" in STEP S103), the controller 41 sets a learning content 212 having the largest number of matches for the search terms, as a candidate to be recommended (STEP S104). Specifically, in the case where there is a plurality of learning content 212 having the numbers of matches for the search terms exceeding the defined value, the controller 41 sets a learning content 212 including the largest number of search terms, of the plurality of learning contents 212, as a candidate for a learning content 212 to be recommended to the user. Meanwhile, in the case where the number of learning contents 212 having the numbers of matches for the search terms exceeding the defined value is one, the controller 41 sets the corresponding learning content 212 as a candidate to be recommended.

If setting a candidate to be recommended, the controller 41 determines whether browsing of the learning content 212 having the largest number of matches for the search terms, i.e. the candidate to be recommended has not been completed (STEP S105). Specifically, with reference to the browse information 272 stored in the database 430, the controller 41 determines whether the browsing state of the learning content 212 which is the candidate to be recommended is 100% or not. In the case where the browsing state is not 100%, the controller 41 determines that browsing of the learning content 212 which is the candidate to be recommended has not been completed.

In the case where browsing of the learning content 212 having the largest number of matches for the search terms has been completed ("YES" in STEP S105), the controller 41 proceeds to STEP S102 of the processing, and determines that there is no content to be recommended. In contrast, in the case where browsing of the learning content 212 having the largest number of matches for the search terms has not been completed ("NO" in STEP S105), the controller 41 selects the corresponding learning content 212 as a content to be recommended (STEP S106).

If selecting a content to be recommended, the controller 41 determines whether there is any learning plan 213 including the selected content to be recommended (STEP S107). Specifically, with reference to the content information 435 stored in the database 430, the controller 41 determines whether there is any learning plan 213 including the selected content to be recommended, in the plurality of learning plans 213 which the user can browse on the electronic device 2.

In the case where there is no learning plan 213 including the selected content to be recommended ("NO" in STEP S107), the controller 41 determines that there is no plan to be recommended (STEP S108). Also, even in the case where it is determined in STEP S102 that there is no content to be recommended, in STEP S108, the controller determines that there is no plan to be recommended. If determining that there is no plan to be recommended, the controller 41 finishes the process of selecting a content to be recommended, shown in FIG. 18.

In contrast, in the case where there is any learning plan 213 including the selected content to be recommended ("YES" in STEP S107), the controller 41 determines whether the number of learning plans 213 including the selected content to be recommended is two or more, or not (STEP S109).

In the case where the number of learning plans 213 including the selected content to be recommended is two or more ("YES" in STEP S109), the controller 41 selects a plan having the largest average number of matches for the search terms, as a plan to be recommended (STEP S110). Specifically, with respect to each of the plurality of learning plans 213 including the content to be recommended, the controller 41 calculates the average number of search terms included in two or more learning contents 212 which are parts of the corresponding plan. Then, the selecting unit 450 selects a learning plan 213 having the largest average, as a plan to be recommended.

In contrast, in the case where the number of learning plans 213 including the selected content to be recommended is one ("NO" in STEP S109), the controller 41 selects the corresponding plan as a plan to be recommended (STEP S111). If selecting a plan to be recommended in the above-mentioned way, the controller 41 finishes the process of selecting a content to be recommended, shown in FIG. 18.

Referring to FIG. 17 again, if selecting a content to be recommended and a plan to be recommended, the controller 41 transmits recommended information representing the selected content to be recommended and the selected plan to be recommended, to the communication terminal 3, by serving as the transmitter 470 (STEP S15). In the communication terminal 3, the controller 31 receives the recommended information transmitted from the server 4, by serving as the receiver 350.

If receiving the recommended information, the controller 31 offers the received recommended information by serving as the offering unit 370 (STEP S16). For example, as shown in FIG. 15, the controller 31 displays the recommended content and the recommended plan represented by the received recommended information, on the display unit 34. In this way, the controller 31 offers the learning content 212 and the learning plan 213 which needs to be learned, to the user. Then, the processing shown in FIG. 17 finishes.

As described above, the information processing system 1 according to the present embodiment selects a content to be recommended to the user, from the plurality of learning contents 212 which the user can browse, on the basis of the history of search terms input by the user, and the browsing states of the plurality of learning contents 212, and offers the recommended content to the user. Therefore, even in the case where the user has difficulty in selecting a learning content 212 which the user needs to learn from the plurality of available learning contents 212 by himself or herself, according to the current learning level, state, and so on of the user, it is possible to offer a learning content 212 appropriate for the user. As a result, the information processing system 1 according to the present embodiment can effectively support the user in learning.

(Modifications)

Although the embodiment of the present invention has been described, the above-described embodiment is an example, and the range of application of the present invention is not limited thereto. In other words, the embodiment of the present invention can be modified in various forms, and all of such modifications are included in the scope of the present invention.

For example, in the above-described embodiment, the information processing system 1 selects one content appropriate for the user, as a content to be recommended, from the plurality of learning contents 212, and offers the recommended content. However, in the present invention, the information processing system 1 may offer a plurality of recommended contents. Specifically, in the case where there is a plurality of learning contents 212 having the numbers of matches for the search terms exceeding the defined value, the selecting unit 450 may select those learning contents 212, not only a learning content 212 having the largest number of matches for the search terms, as candidate contents. In the case where there is a plurality of learning contents 212 having not been completely browsed, in the plurality of learning contents 212 selected as candidate contents, the selecting unit 450 may select those learning contents 212 as contents to be recommended.

Alternatively, the selecting unit 450 may select a content to be recommended, with reference to information on the categories including the learning contents 212. In other words, the selecting unit 450 may select a content to be recommended, on the basis of the browsing states of the plurality of learning contents 212, and the categories associated with the learning contents 212. Categories into which learning contents 212 for learning English are classified are the types of the learning contents 212, such as vocabulary, pronunciation, conversation, and so on. Specifically, the selecting unit 450 selects a category to be recommended to the user, from the plurality of categories, on the basis of the browsing states of the plurality of learning contents 212 by the user. For example, in the case where many of learning contents 212 having been browsed much by the user belong to some of the plurality of categories, it can be considered that the user is learning mainly some learning contents 212 belonging to some corresponding categories. For this reason, the selecting unit 450 selects a category belonging to some corresponding categories, as a category to be recommended. Alternatively, in order to recommend the user to learn various categories in balance, the selecting unit 450 may select a category belonging to the other categories, as a category to be recommended. As described above, the selecting unit 450 can select categories to be recommended, by various criteria.

If selecting a category to be recommended in the above-mentioned way, the selecting unit 450 selects learning contents 212 belonging to the selected category to be recommended, as contents to be recommended. Especially, in the case where a plurality of learning contents 212 having the numbers of matches for the search terms exceeding the defined value is selected as candidate contents as described above, from these candidate contents, the selecting unit 450 may select learning contents 212 belonging to the selected category to be recommended, as candidate contents.

As described above, the procedure in which the selecting unit 450 selects contents to be recommended and plans to be recommended is not limited to the procedure described in the embodiment, and it is possible to select contents to be recommended and plans to be recommended by various criteria.

In the above-described embodiment, the receiver 410 stores the date and time when search information 271 was received from the communication terminal 3, as the search date and time of a search term included in the search information 271, in the search term list 431 of the database 430. However, in the present invention, as search dates and times, dates and times when searches have actually been performed on the electronic device 2 may be used. In this case, in the electronic device 2, when a search term input by the user has been searched for, the search unit 230 stores the search date and time in association with the search term in the search information 271. Search date and time information is provided as a part of search information 271 to the communication terminal 3 and the server 4, and is stored in the search term list 431. In the case of using the date and time when a search has actually been performed as search date and time as described above, as compared to the case of using the date and time of reception by the server 4 as search date and time, the amount of communication data increases, but the accuracy of the search date and time improves.

In the above-described embodiment, the information processing system 1 includes the electronic device 2, the communication terminal 3, and the server 4. However, in the present invention, the configuration of the information processing system 1 is not limited thereto. For example, the communication terminal 3 may have the function of the server 4 according to the above-described embodiment. In other words, the communication terminal 3 may have the function of the selecting unit 450 for selecting a content to be recommended on the basis of search information 271 and browse information 272 acquired from the electronic device 2, and the function of the offering unit 370 for offering the recommended content. In this case, it is possible to omit the server 4 from the information processing system 1.

Also, the electronic device 2 may have a function of performing direct communication with the server 4, and the server 4 may have the function of the acquiring unit 310 for acquiring search information 271 and the browse information 272 from the electronic device 2, the function of the selecting unit 450 for selecting a content to be recommended on the basis of the acquired search information 271 and the acquired browse information 272, and the function of the offering unit 370 for offering the recommended content to the user of the electronic device 2. In this case, it is possible to omit the communication terminal 3 from the information processing system 1.

Further, the information processing system 1 may be configured with only the electronic device 2. In other words, the electronic device 2 may have the function of the selecting unit 450 for selecting a content to be recommended, on the basis of the history of search terms input by the user and the browsing states of the plurality of learning contents 212, and the function of the offering unit 370 for offering the recommended content to the user. As described above, by various configurations, the information processing system 1 according to the present invention can be implemented.

In the above-described embodiment, as the electronic device 2, an electronic dictionary has been described as an example. However, in the present invention, the electronic device 2 is not limited to an electronic dictionary, and may be any other device such as a personal computer, a smart phone, a mobile phone, or the like as long as the corresponding device can receive user's search term inputs and perform searches. Also, the dictionary contents 211 which are objects to be searched, or the learning contents 212 which are objects to be browsed may be contents which exist outside the electronic device 2 and can be accessed from the electronic device 2 by wire or wireless communication and be used on the electronic device.

Further, objects to be searched is not limited to the dictionary contents 211, and may be other contents including learning contents 212. Also, a plurality of contents which is objects to be browsed is not limited to learning contents 212, and may be contents for purposes other than learning, such as electronic books and so on. In other words, the purpose of the information processing system 1 according to the present invention is not limited to supporting a user in learning.

In the above-described embodiment, the offering unit 370 offers recommended information received from the server 4, to the user, by displaying the recommended information on the display unit 34. However, the offering unit 370 may offer recommended information received from the server 4, to the user, by outputting the recommended information in voice from a speaker.

In the above-described embodiment, in each of the controller 21, 31, and 41, the CPU serves as the individual units shown in FIG. 5 or FIG. 12 by executing the program stored in the ROM. However, in the present invention, each of the controllers 21, 31, and 41 may include dedicated hardware such as an ASIC (Application Specific Integrated Circuit), an FPGA (Field-Programmable Gate Array), various control circuits, and so on, instead of the CPU, and the dedicated hardware may serve as the individual units shown in FIG. 5 or FIG. 12. In this case, the functions of the individual units may be implemented by pieces of hardware, respectively, or the functions of the individual units may be collectively implemented by one piece of hardware. Also, some of the functions of the individual units may be implemented by dedicated hardware, and the other functions may be implemented by software or firmware.

Also, it goes out without saying that it is possible to provide an electronic device, a communication terminal, and a server having configurations for implementing the functions related to the present invention, and it also is possible to make existing information processing devices and so on serve as the electronic device, the communication terminal, and the server according to the present invention. In other words, by applying a program for implementing the functional components according to the electronic device 2, the communication terminal 3, and the server 4 taken as examples in the above-described embodiment such that CPUs and the like configured to control existing information processing devices and so on can execute the program, it is possible to make those devices serve as the electronic device, the communication terminal, and the server according to the present invention.

Also, such a program may be applied in an arbitrary way. It is possible to apply the program by storing the program in computer-readable recording media such as flexible discs, compact disc (CD) ROMs, digital versatile disc (DVD) ROMs, memory cards, and so on. Also, it possible to apply the program via communication media such as the Internet and so on by superimposing the program on a carrier wave. For example, it also is possible to post the program on a bulletin board system (BBS) on a communication network such that the program can be distributed. Also, the above-described processing may be performed by activating the program and executing the program at the same time as other application programs under the control of an OS (Operating System).

What is claimed is:

1. A data processing method comprising:
   managing a search history in a computer memory, the search history including search terms that a user searched for from among a plurality of terms in a dictionary, the search history including the search terms in association with search times;
   updating, in a case where the user searches for one of the plurality of terms in the dictionary, the search history managed in the computer memory;
   managing, in the computer memory, independently of the search history, a learning progress that represents different information than the search history, the learning progress being managed with respect to each of a plurality of learning contents that are different from the dictionary, the learning progress indicating how much a user has browsed each of the plurality of learning contents;
   updating, in a case where the user uses one of the plurality of learning contents, the learning progress managed in the computer memory, the learning progress being updated independently of the search history such that the learning progress is updated in a case where the user uses one of the plurality of learning contents regardless of whether the user searches for one of the plurality of terms in the dictionary, and the search history is updated in a case where the user searches for said one of the plurality of terms in the dictionary regardless of whether the user has used or completed any of the plurality of learning contents;
   performing a first determination comprising determining that a number of in-period search terms included in the search history is equal to or larger than a predetermined value or not, the in-period search terms being search terms associated with search dates and times included in a prescribed period in the past;
   after determining in the first determination that the number of the in-period search terms is equal to or larger than the predetermined value, performing a second determination comprising determining a recommendable learning content among the plurality of learning contents, wherein the recommendable learning content is a learning content among the plurality of learning contents which has not been completed by the user and which includes a defined number or more of terms matching a plurality of the in-period search terms; and
   outputting information representing the recommendable learning content determined in the second determination.

2. The data processing method according to claim 1, wherein:
   the search history manages strings that the user input for searching the dictionary,
   the learning progress includes at least one of:
      a number or ratio of questions that have been answered correctly by the user out of questions included in the learning contents;
      a number or ratio of audio data items that have been played back by the user out of audio data items included in the learning contents; and
      a number or ratio of pages or items that have been browsed by the user out of pages or items included in the learning contents.

3. The data processing method according to claim 2, wherein performing the second determination further comprises determining that there are a plurality of the recommendable learning contents, and wherein the method further comprises:
   managing, in the computer memory, learning progress of learning plans, each of which is a unique combination of a plurality of the learning contents; and
   outputting information representing the learning plans each of which includes one of the recommendable learning contents determined in the second determination.

4. The data processing method according to claim 3, further comprising:
   calculating, for every learning plan, an average number of the in-period search terms included in each of the learning contents;
   selecting a learning plan with the highest average number of the in-period search terms from among the learning plans as a to-be-recommended learning plan; and
   outputting information representing the to-be-recommended learning plan.

5. The data processing method according to claim 1, wherein
   each of the plurality of learning contents is associated with any one of a plurality of categories, and
   performing the second determination includes determining the recommendable learning content based on the learning progress of the plurality of learning contents and categories associated with the plurality of learning contents.

6. The data processing method according to claim 1, wherein
   the data processing method is performed by a data processing system including a communication terminal and a server, and
   the communication terminal is configured to perform:
      acquiring search information representing the search history and the learning progress of the plurality of learning contents;
      transmitting the acquired search information and the acquired learning progress to the server;
      receiving information representing the recommendable learning content from the server; and
      outputting information representing the recommendable learning content represented by the received information, and
   the server is configured to perform:
      receiving the search information and the learning progress transmitted from the communication terminal;
      performing the first determination and second determination based on the received search information and the received learning progress; and
      transmitting the information representing the recommendable content to the communication terminal.

7. An electronic device comprising:
   a processor; and
   a memory storing instructions that, when executed by the processor, cause the processor to:
   manage a search history in a computer memory, the search history including search terms that a user searched for from among a plurality of terms in a dictionary, the search history including the search terms in association with search times;
   update, in a case where the user searches for one of the plurality of terms in the dictionary, the search history managed in the computer memory;
   manage, in the computer memory, independently of the search history, a learning progress that represents different information than the search history, the learning progress being managed with respect to each of a plurality of learning contents that are different from the dictionary, the learning progress indicating how much a user has browsed each of the plurality of learning contents;

update, in a case where the user uses of one of the plurality of learning contents, the learning progress managed in the computer memory, the learning progress being updated independently of the search history such that the learning progress is updated in a case where the user uses one of the plurality of learning contents regardless of whether the user searches for one of the plurality of terms in the dictionary, and the search history is updated in a case where the user searches for said one of the plurality of terms in the dictionary regardless of whether the user has used or completed any of the plurality of learning contents;

perform a first determination comprising determining whether a number of in-period search terms included in the search history is equal to or larger than a predetermined value or not, the in-period search terms being search terms associated with search dates and times included in a prescribed period in the past;

in a case in which it is determined in the first determination that the number of the in-period search terms is equal to or larger than the predetermined value, perform a second determination comprising determining whether there is any recommendable learning content among the plurality of learning contents, wherein the recommendable learning content is a learning content among the plurality of learning contents which has not been completed by the user and which includes a defined number or more of terms matching a plurality of the in-period search terms; and in a case in which it is determined in the second determination that there is the recommendable learning content, output information representing the recommendable learning content.

8. A non-transitory recording medium having a program recorded thereon that is executable by a computer to control the computer to:

manage a search history in a computer memory, the search history including search terms that a user searched for from among a plurality of terms in a dictionary, the search history including the search terms in association with search times;

update, in a case where the user searches for one of the plurality of terms in the dictionary, the search history managed in the computer memory;

manage, in the computer memory, independently of the search history, a learning progress that represents different information than the search history, the learning progress being managed with respect to each of a plurality of learning contents that are different from the dictionary, the learning progress indicating how much a user has browsed each of the plurality of learning contents;

update, in a case where the user uses one of the plurality of learning contents, the learning progress managed in the computer memory, the learning progress being updated independently of the search history such that the learning progress is updated in a case where the user uses one of the plurality of learning contents regardless of whether the user searches for one of the plurality of terms in the dictionary, and the search history is updated in a case where the user searches for said one of the plurality of terms in the dictionary regardless of whether the user has used or completed any of the plurality of learning contents;

perform a first determination comprising determining whether a number of in-period search terms included in the search history is equal to or larger than a predetermined value or not, the in-period search terms being search terms associated with search dates and times included in a prescribed period in the past;

in a case in which it is determined in the first determination that the number of the in-period search terms is equal to or larger than the predetermined value, perform a second determination comprising determining whether there is any recommendable learning content among the plurality of learning contents, wherein the recommendable learning content is a learning content among the plurality of learning contents which has not been completed by the user and which includes a defined number or more of terms matching a plurality of the in-period search terms; and in a case in which it is determined in the second determination that there is the recommendable learning content, output information representing the recommendable learning content.

9. The data processing method according to claim 1, further comprising:

performing a third determination comprising determining a recommendable learning plan including the recommendable learning content from among a plurality of learning plans, the plurality of learning plans each including a plurality of learning contents, a combination of the learning contents differing from one another among the learning plans; and outputting information representing the recommendable learning plan determined in the third determination.

10. The data processing method according to claim 9, further comprising:

selecting, from among the plurality of recommendable learning plans determined in the third determination, a learning plan having a largest average number of the in-period search terms per learning content included therein; and outputting information representing the selected learning plan.

* * * * *

UNITED STATES PATENT AND TRADEMARK OFFICE
CERTIFICATE OF CORRECTION

| | | |
|---|---|---|
| PATENT NO. | : 11,868,345 B2 | |
| APPLICATION NO. | : 16/136002 | |
| DATED | : January 9, 2024 | |
| INVENTOR(S) | : Kentaro Ogawa | |

It is certified that error appears in the above-identified patent and that said Letters Patent is hereby corrected as shown below:

In the Claims

Column 23, Line 5, after "uses" delete "of".

Signed and Sealed this
Twentieth Day of February, 2024

Katherine Kelly Vidal
*Director of the United States Patent and Trademark Office*